Aug. 27, 1968   D. B. POLLOCK ET AL   3,398,569

SIMULATOR

Filed Jan. 6, 1966   2 Sheets-Sheet 1

INVENTORS
DAVID B. POLLOCK
IRVIN H. SWIFT
BY Richard D. Seibel

ATTORNEY

Aug. 27, 1968  D. B. POLLOCK ET AL  3,398,569

SIMULATOR

Filed Jan. 6, 1966  2 Sheets-Sheet 2

INVENTORS
DAVID B. POLLOCK
IRVIN H. SWIFT
BY Richard D. Seibel
ATTORNEY

United States Patent Office 3,398,569
Patented Aug. 27, 1968

3,398,569
SIMULATOR
David B. Pollock, Huntington Beach, and Irvin H. Swift, Rolling Hills Estates, Calif., assignors to North American Rockwell Corporation, a corporation of Delaware
Filed Jan. 6, 1966, Ser. No. 519,108
13 Claims. (Cl. 73—1)

ABSTRACT OF THE DISCLOSURE

A cryogenic simulator for calibration and test of infra-red radiometers comprises a thermally insulated shell cooled with liquid nitrogen. A diffuse reflecting surface is mounted at one end of the simulator and at the opposite end two sources of radiant energy provide controlled flux of infra-red radiation. One of the sources simulates a target that emits infra-red radiation and a chopper intermittently interrupts radiant energy therefrom. The other radiation source simulates background flux of infra-red radiation. The background radiation source illuminates the entire diffuse reflecting surface and in a preferred embodiment that target source is imaged on the diffuse reflecting surface for illuminating a relatively small area thereof.

---

Figure 1:
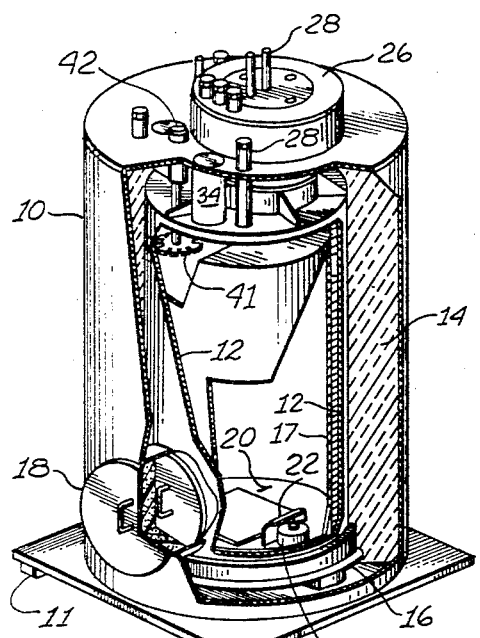

In recent years photosensitive semi-conductors have been employed in radiometers for the detection and measurement of infra-red radiation and by cooling these sensors to liquid helium temperatures the noise induced by the sensor itself becomes negligible and the ability of the sensor to detect a source of infrared radiation is limited by the general background of infrared radiation that may impinge on the sensor from other sources.

With the advent of such background limited photodetectors useful for the detection of relatively long wave length infrared there has developed a need for simulating equipment having very low background radiation flux for the calibration of these sensors.

It is therefore a broad object of this invention to provide a low background infrared simulator.

Thus in the practice of this invention according to a preferred embodiment there is provided a simulator that is readily cooled to liquid nitrogen temperatures so that a radiometer mounted therein is exposed to a background of extremely low flux. Sources of radiant energy are provided for illuminating a radiometer in the simulator with radiant energy having a spectral distribution corresponding to a temperature higher than the temperature of the simulator.

In a preferred embodiment the simulator comprises a thermally insulated housing having an opaque inner shell therein. Immediately surrounding the inner shell is a space that is readily filled with liquid nitrogen to bring the entire surface of the inner shell to the temperature of liquid nitrogen, about 77° Kelvin. It is preferred to flood the floor of the inner chamber with liquid nitrogen so that good cooling is obtained and in addition dry nitrogen gas from the liquid nitrogen boiloff is present to fill the inner chamber to provide a dry atmosphere transparent to infrared radiation. A reflecting surface, preferably diffuse, is mounted above the floor of the inner chamber and in good thermal contact with the liquid nitrogen.

At the top of the simulator there is provided a chamber within which a radiometer or the like can be mounted. The chamber which is also cooled to liquid nitrogen temperature, is fitted with a window that is transparent to infrared radiation so that the test radiometer can see the reflecting surface on the bottom of the simulator. Also at the top of the simulator there are provided two sources of radiant energy that can be maintained at a controlled temperature above the temperature of the inner chamber to provide a controlled flux of infrared radiation. One of these sources is used to stimulate a target that emits infrared radiation and this source is provided with a chopper for intermittently interrupting radiant energy therefrom. The other radiation source is used to increase the background flux of infrared radiation in the simulator above that of a surface at liquid nitrogen temperatures. During use of the simulator radiant energy from at least the target source is directed on the reflecting surface in the bottom of the simulator and is reflected therefrom to impinge on a radiometer within the containing cavity. If it is desired in a particular test, background radiation can also be increased by use of the second radiation source.

Thus it is a broad object of this invention to provide a low flux background for an infrared detector.

It is a further object of this invention to provide a simulator for background limited photodetectors.

It is a further object of this invention to provide a controlled flux of infrared radiation.

Figure 2:
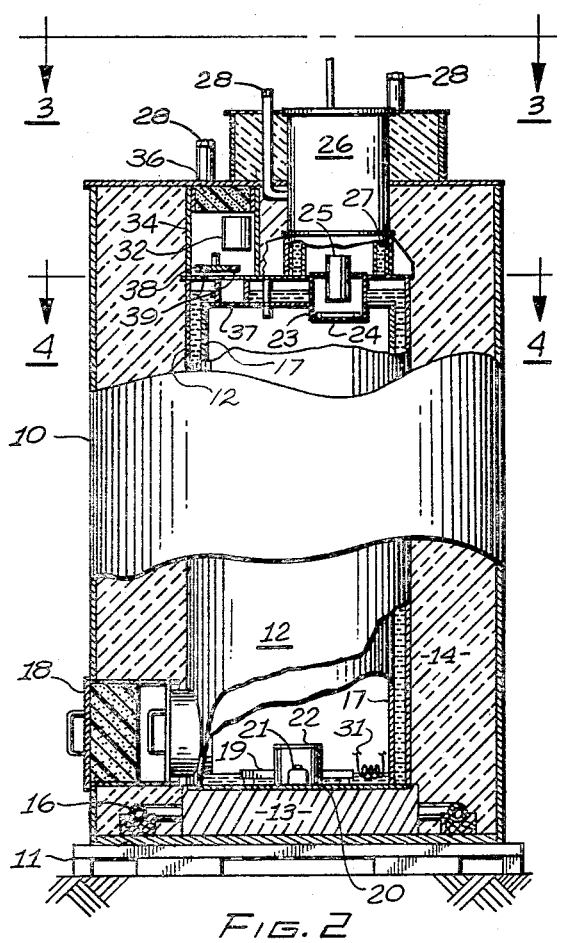
Figure 3:
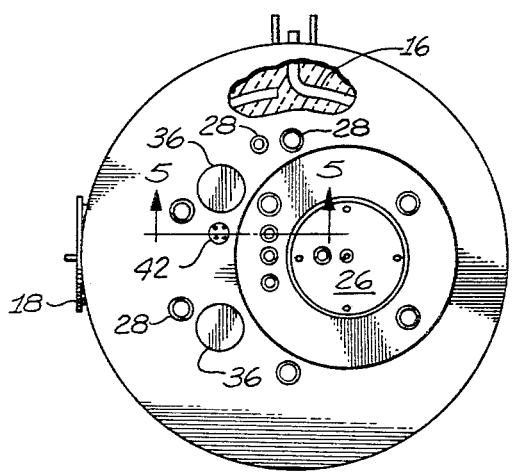
Figure 4:
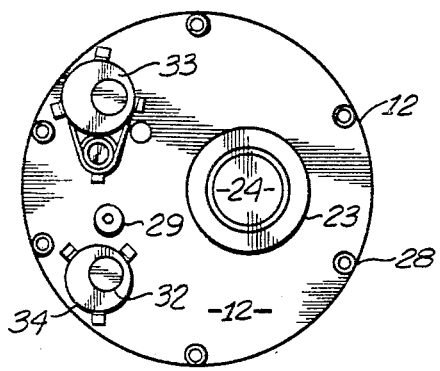
Figure 5:
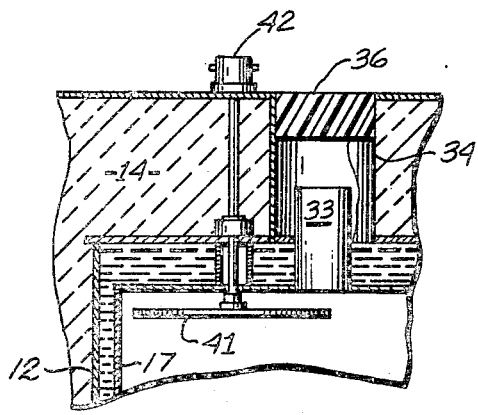
Figure 6:
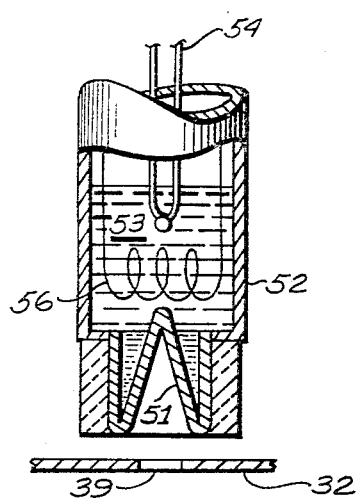
Figure 7:
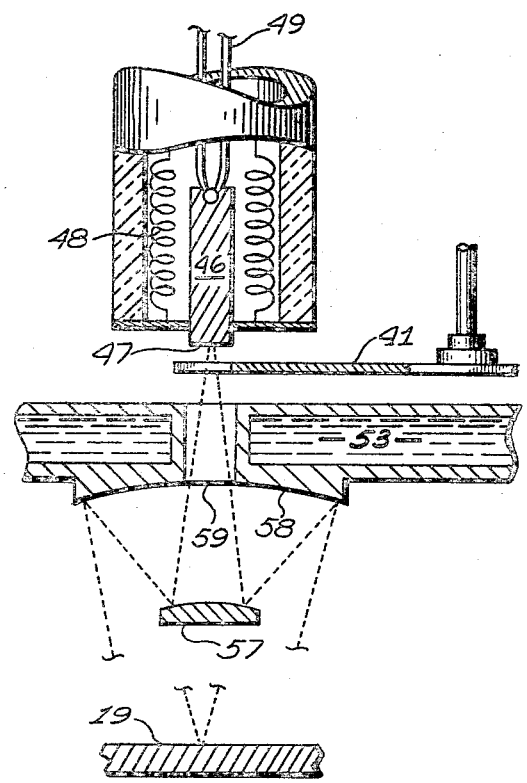

Other objects and many of the attendant advantages of this invention will be readily appreciated as the same becomes better understood by reference to the following detailed description when considered in connection with the accompanying drawings wherein:

FIG. 1 illustrates a perspective view of a simulator constructed according to the principles of this invention;
FIG. 2 comprises a vertical section through the simulator of FIG. 1;
FIG. 3 is a top view of the simulator of FIG. 1;
FIG. 4 is a partial horizontal section of the simulator of FIG. 1;
FIG. 5 illustrates a partial vertical section of the simulator of FIG. 1;
FIG. 6 is a typical source of radiant energy for the simulator; and
FIG. 7 is another typical source of radiant energy useful in the simulator of FIG. 1.

Throughout the drawings like numerals refer to like parts.

In recent years there has been developed a family of radiometers or photodetectors that are sensitive to infrared radiation. It has been found that these solid state photodetectors have an extremely low inherent noise level when they are cooled to liquid helium temperatures. Such a photodetector is then limited in its sensitivity by the noise due to general background radiation impinging on the photodetectors and these devices are known as background limited. In order to detect and track satellites or other bodies outside of the earth's atomsphere, it is convenient to employ a tracking instrument using background limited photodetectors as the sensors. The background radiation from free space is in the order of $10^{15}$ photons per steradian per second in the wave length range of about one to thirty microns. With the angle of view of many of the modern background limited sensors the total flux on the photodetector due to background radiation is in the order of $10^6$ photons per second. It is found that surfaces at the temperature of liquid nitrogen have an emission of infrared radiation in this wavelength region approximating that of free space, thus the characteristic radiation of free space can be simulated by surrounding a radiometer with surfaces having a temperature approximately that of liquid nitrogen.

It is desirable in detecting objects in space to have a sensitivity in the radiometer in the order of $10^6$ to $10^9$ photons per second so that rather small objects at low temperatures can be detected and tracked at long range. The level of sensitivity becomes apparent when it is recognized that this lower flux corresponds approximately to the flux of infrared radiation received by a detector from one square meter of ice at a range of a thousand nautical miles from the detector.

Thus in the practice of this invention there is provided a chamber in which all of the surfaces to which a radiometer would be exposed are cooled to substantially liquid nitrogen temperatures. In addition means are provided for illuminating the radiometer with radiant energy having controlled flux levels of $10^6$ to $10^9$ photons per second. Certain other aspects of a simulator for providing infrared radiation to a radiometer for calibration and test are described and claimed in a copending patent application Serial Number 519,137 entitled "Infrared Simulator" filed concurrently herewith by Jack T. Cragin and Maciej J. Makowski and assigned to North American Rockwell Corporation, the asignee of this invention.

FIG. 1 illustrates a simulator incorporating the principles of this invention. As illustrated in this embodiment there is provided an outer shell 10 that provides a closed container for the simulator. It has been found convenient to mount the outer shell on a skid 11 that is preferably fabricated to accommodate a fork lift truck for portability of the simulator. The outer shell 10 is preferably constructed of sheet steel or aluminum in the form of an upright cylinder and an opening is left in the top to accommodate a cover as hereinafter described. Within the outer shell 10 there is provided a middle shell 12 that is also constructed of steel sheet or aluminum in the form of an upright cylinder having an opening in the top to accommodate a cover. The middle shell 12 rests on a slab of rigid polyurethane foam 13 which supports the middle shell above the base of the simulator and provides good thermal insulation for the middle shell. Between the middle and outer shells is a space that is filled with perlite 14 to provide thermal insulation. Perlite is a natural $SiAl_2O_3$ that has a very low thermal conductivity and is relatively inexpensive. Other insulators such as Santocel, calcium silicate and diatomaceous earth or the like can also be used between the shells although precautions must be taken since most of these materials are hygroscopic. A coil of tubing 16 having a number of small apertures therein is provided around the bottom of the space between the middle and outer shells for admitting dry nitrogen gas to the perlite insulation. This serves to purge any moisture or air from the perlite and prevents the formation of frost or liquefied air during use of the simulator.

Within the middle shell is an inner shell 17 also constructed of sheet steel or aluminum in the form of an upright cylinder. The inner shell 17 is spaced apart from the middle shell 12 around the periphery of the inner shell. The middle shell and inner shell have a common liquid tight bottom or floor 20. A thermally insulated access door 18 comes through one side of the simulator near the bottom for providing access from the exterior of the simulator to the interior of the inner shell 17.

Within the inner shell and at the bottom thereof there is mounted a bottom plate 19 with a reflective surface on the top thereof and in a preferred embodiment the reflective surface is a flat diffuse reflector. This diffuse reflector has a very low emissivity and a surface texture that produces efficient diffusing properties at the long wave lengths of radiation present in the simulator during use. A very effective diffuse reflector is readily fabricated by crinkling shiny aluminum foil and securing this to the bottom plate 19 so as to form the upper surface thereof. It has been established that such a surface is diffuse with a reflection coefficient of about 85 percent and is a relatively inexpensive, easily replaceable diffuse reflector. A diffuse reflector can also be made by sandblasting an aluminum plate, however, means must be taken to limit the oxidation of the aluminum to prevent reduction of the reflectance by absorption by aluminum oxide. A thin gold coating applied by vacuum deposition can serve to minimize the formation of aluminum oxidation. A diffuse reflector can also be made by coating an aluminum plate with a slurry of magnesium oxide and magnesium carbonate to obtain a good diffuse reflective surface throughout a large portion of the infrared spectrum.

Also located on the bottom of the chamber formed by the inner shell is a conventional liquid level sensor 21 which in a preferred embodiment is set so as to maintain a liquid nitrogen level about two inches above the bottom of the inner chamber when the floor is flooded during use. Any conventional liquid level sensor employing floats, resistive sensors or other techniques can readily be employed in the simulator. A suitable liquid level sensor has been found to be the liquid switch S-II available from Cosmodyne Corp., Hawthorne, Calif. A thermal shield 22 is interposed over the liquid level sensor 21 so that any background radiation therefrom is prevented from impinging on a radiometer in the simulator or on the bottom plate 19.

At the top portion of the simulator and mounted on the top of the inner shell 17 there is provided a radiometer chamber 23 that provides a closed cavity within which an infrared sensor or radiometer 25 can be mounted for calibration or evaluation. The radiometer chamber 23 extends between the middle and inner shells 12 and 17 respectively into the main chamber of the simulator within the inner shell. A window 24 made of a material transparent to infrared radiation is in between the radiometer chamber and the interior of the inner shell so that the reflective surface of the bottom plate 19 can illuminate the radiometer or photodetector 25 mounted within the radiometer chamber, and the atmosphere in the main chamber is excluded from the radiometer chamber.

Above the radiometer chamber 23 and within the opening in the top of the outer shell 10 there is a thermally insulated cover 26 including a jacket 27 that can be filled with a cryogenic liquid such as liquid nitrogen in the same manner as the jacket provided by the inner shell 17 and the middle shell 12 in the main body of the simulator. The cooled cover 26 provides a low temperature environment over the top of the radiometer chamber as well as around the bottom where the radiometer chamber is exposed to the inner chamber of the simulator. Suitable fill and vent lines 28 are provided on the cover as well as on the main body of the simulator so that a cryogenic liquid can be supplied within the appropriate portions of the simulator. The fill and vent lines are preferably insulated with a foam type of thermal insulation to minimize the loss of cryogenic liquid and inhibit the formation of frost and liquid air on the fill lines.

A liquid level sensor 29 is mounted on the top of the inner shell 17 in such a way that a liquid nitrogen level is maintained about two or three inches above the top of the inner shell. During operation of the simulator liquid nitrogen or other suitable cryogenic liquid is supplied through the lines 28 to fill the space between the inner and middle shells and raise the liquid level to the control point of the liquid level sensor 29 on the top of the inner shell. Liquid nitrogen is also added on the floor of the inner shell 17 to the control point of the liquid level sensor 21. It may be convenient to provide a conventional feedback type of control (not shown) on the liquid level sensors so that the liquid levels in the simulator are maintained constant without attention by the operator. It will be apparent that the sensors can also be manually monitored and additional liquid nitrogen manually added by way of the fill lines 28 to maintain a suitable liquid level. Cryogenic liquid is also provided in the jacket 27 in the cover so that the radiometer chamber 23 is substantially completely surrounded by the cryogenic liquid and the background radiation flux is maintained at a low level.

During operation liquid nitrogen is maintained in the interior of the inner shell 17 so as to flood the bottom thereof up to a depth of about two inches. This level brings the liquid nitrogen in contact with the bottom plate 19 so that it is at the temperature of the liquid nitrogen. It is preferred to have the liquid nitrogen within the main chamber of the simulator rather than in an external jacket on the bottom so that there is no possibility of gas bubbles forming under the bottom to disturb the thermal equilibrium, and to assure that the bottom plate is at the temperature of liquid nitrogen.

The liquid nitrogen in the bottom of the main chamber also supplies dry nitrogen gas due to boiloff of the liquid nitrogen. This dry nitrogen gas fills the main chamber, displacing any air present, and provides an atmosphere within the main chamber of the simulator that is transparent to infrared radiation in the wave lengths of interest. A small electric heater 31 such as a Calrod unit is provided beneath the surface of the liquid nitrogen to increase the rate of boiloff of the liquid nitrogen to provide sufficient nitrogen gas to insure complete elimination of air. In a simulator constructed according to the principles of this invention having a six-inch thick slab of polyurethane foam 13 and twelve inches of perlite insulation 14 it has been found that the rate of liquid nitrogen boiloff may be insufficient without the heater 31 to provide sufficient nitrogen gas for a clear atmosphere. The large volume of nitrogen gas evolved in initial cooldown of the simulator is sufficient to displace air from the main chamber of the simulator.

In the top of the simulator and mounted in openings extending through the outer shell 10 there are two infrared radiation sources 32 and 33. A fiberglass cylinder 34 is around each of the radiation sources to contain the perlite insulation between the middle and outer shells. A polyurethane foam plug 36 is mounted above each of the radiation sources to minimize heat flow. An aperture 37 is provided between each of the radiation sources 32 and 33 respectively and the main chamber of the simulator. This aperture penetrates the inner and middle shells so that radiation from the radiation sources can enter the main chamber within the inner shell.

A rotatable disk 38 is provided between the radiation source 32 and the main chamber of the simulator. The disk 38 has a series of apertures 39 having a range of sizes so that the area of the radiation source 32 available for illuminating the interior of the simulator can be controlled by interposing an aperture of selected size in front of the radiation source. As illustrated in FIG. 5 a chopper disk 41 is mounted between the radiation source 33 and the interior of the simulator. This chopper disk comprises a plurality of sectors around the periphery with alternate sectors removed so that rotation of the disk provides an intermittent interruption of radiation from the radiation source 33. A small variable speed electric motor 42 is connected to the chopper disk 41 so that variable speed rotation can be obtained. By changing the number of sectors on the rotating chopper disk and the speed of rotation of the motor, modulations of the radiation in the range of from about 100 to 2000 cycles per second are readily available.

The radiation sources 32 and 33 can be similar or different types of sources as may be desired in a particular simulator. Preferably these sources are black body or approximately black body radiators that are amenable to temperature control. A suitable black body radiator that is useful for either or both of the radiation sources 32 and 33 is commercially available from Electro-Optical Industries as Model 202 Black Body.

An economical radiation source useful for either radiation source in the simulator is illustrated schematically in FIG. 7. This comprises a copper rod 46 having a flat surface 47 on the end thereof adjacent an aperture 39 in the disk 38. The flat surface 47 is roughened with abrasive paper or by sandblasting and blackened by oxidation in air at elevated temperature. By this means an emissivity in the order of .85 or greater is obtained which is sufficient for use in the simulator. An electric heater 48 is provided adjacent the copper rod 46 for raising the temperature of the copper rod above that of the surroundings which during conventional operation will be at the temperature of liquid nitrogen. A suitable radiation source employs a flat copper rod in place of the conventional tip on a 500-watt solder iron and temperatures up to 350° Kelvin are readily maintained. A thermocouple 49 is preferably provided in the copper block 46 for temperature measurement so that the temperature of the radiation source can be automatically controlled.

Another type of black body source found to be useful for either radiation source in the infrared simulator comprises a liquid bath black body as illustrated schematically in FIG. 6. This radiation source comprises a 14° hollow copper cone 51 which serves as the black body cavity. This cone is connected to a liquid reservoir 52 and the reservoir is filled with a suitable liquid 53, the temperature of which can be monitored by a thermocouple 54. Beneath the surface of the liquid is an electric heating element 56 such as a Calrod or the like. The black body cavities as illustrated in FIG. 6 are preferably operated at discrete temperature levels corresponding to boiling points or the like. Thus, for example, the black body can be maintained at approximately 200° Kelvin when the reservoir is filled with acetone and solid carbon dioxide. Similarly the black body can be maintained at 373° Kelvin by maintaining boiling water within the reservoir. In either instance heat is preferably supplied by way of the heater 56 to prevent undercooling of the liquid within the reservoir. It has been found that a rapid boil is required in a black body as illustrated in FIG. 6 in order to minimize thermal gradients on the black body surface due to circulation of cold nitrogen gas boiloff. The effect of thermal gradients can also be minimized by providing an infrared transparent housing (not shown) surrounding the black body cavity. It will also be apparent to one skilled in the art that conventional incandescent lamps can also be used as a source of radiant energy with the filament of the lamp operated at a relatively low temperature.

Also illustrated schematically in FIG. 7 is an optical arrangement that can be employed in conjunction with one or the other of the radiant energy sources useful in the simulator. This optical arrangement has a convex stainless steel mirror 57 opposite the aperture 39 in front of the emissive surface 47. The convex reflective surface is arranged facing the radiant energy source so as to interrupt substantially all of the radiation from the radiant energy source. A concave stainless steel mirror 58 is mounted so as to face in the same direction as the reflective surface 47 of the radiation source. A central aperture 59 in the concave mirror 58 permits radiation from the radiation source 32 to pass therethrough and impinge on the convex mirror 57. The curvature of the convex and concave mirrors 57 and 58 respectively and the spacing therebetween is arranged so that radiation from the radiation source 32 is dispersed by the concave mirror to illuminate the convex mirror which in turn refocuses the radiation at a distant point. In a simulator such as is described and illustrated the combination of the convex and concave mirrors focuses the image of the radiation source on the bottom plate 19. Because of the distances involved between the radiation source and the bottom plate and between the bottom plate and the radiometer chamber 23, the radiation source and the image thereof can be considered as substantially point sources of radiation. It is apparent that such an optical arrangement can be employed with any suitable black body source such as the one illustrated in FIG. 6 or a commercially available black body source.

In order to operate the simulator described and illustrated, it is preferred to purge the insulation 14 with dry nitrogen gas to prevent the formation of liquid air and frost in the simulator. A conventional radiometer 25 or similar infrared instrument is mounted in the radiometer chamber 23 for calibration or evaluation. When the simulator is adequately purged with dry nitrogen gas, liquid nitrogen is introduced into the space between the inner shell 17 and the middle shell 12 and also into the main chamber of the simulator within the inner shell so as to flood the floor of the inner shell. Filling must proceed relatively slowly due to the large volume of gas produced during the initial cooling of the apparatus. Liquid nitrogen is also introduced into the cover 26 to effect cooling thereof.

When the liquid nitrogen level reaches the level of the liquid level sensors 21 and 29, the flow is interrupted so that the liquid nitrogen level is maintained about two inches above the floor of the main chamber and between two and three inches above the top of the inner shell. This prevents the waste of liquid nitrogen and maintains an enveloping layer of liquid nitrogen around the main chamber of the simulator thereby maintaining the entire main chamber at substantially the temperature of liquid nitrogen.

In tests of a simulator constructed according to the principles of this invention it was found that within 80 minutes after the initial filling of the simulator with liquid nitrogen that all temperatures within the simulator had come to within 3° of liquid nitrogen temperature. With the entire simulator cooled to temperatures of this magnitude, the entire radiometer is also cooled to liquid nitrogen temperatures or possibly the photodetector in the radiometer can be separately cooled to liquid helium temperatures as may be desired for the tests to be run. The background radiation on a test radiometer in the radiometer chamber approximates the background radiation on a radiometer viewing free space.

In order to increase the background radiation, if it should be so desired in a given series of tests, the radiation source 32 is raised to a temperature above the temperature of liquid nitrogen. A suitable aperture 39 is positioned in front of the radiation source so that the combination of the temperature of the source and the size of the aperture provides the desired radiation flux on the bottom plate 19. Radiation reflected from the bottom plate 19 in turn impinges on the radiometer 25 within the radiometer chamber 23 and contributes to the background reading obtained therefrom. As will be apparent to one skilled in the art, it may not be desirable in every instance to increase the background radiation and the radiation source 32 would in that instance be at the temperature of liquid nitrogen.

In order to determined the sensitivity of a radiometer, radiation is directed thereto that simulates radiation from a source that may be observed against the background of free space. For such a purpose the radiation source 33 is raised to a temperature above that of liquid nitrogen by applying electrical heat thereto as described hereinabove. Radiation from this source likewise is directed on the bottom plate 19 either directly for illumination of the entire plate or by means of optics as described and illustrated in FIG. 7 in order to produce a point source of radiation on the reflected surface. In either case radiation is reflected by the bottom plate 19 to illuminate a radiometer within the radiometer chamber 23. If it is desired only to investigate sensitivity of a radiometer, general illumination of the bottom plate by radiation source 33 without any focusing optics is sufficient. If, however, it is desired to investigate the searching or tracking characteristics of a radiometer, focusing optics such as illustrated in FIG. 7 are employed to produce a simulated point source on the bottom plate 19. Radiation apparently emitted by such a point source illuminates the radiometer and the ability of the radiometer to locate this point source can be determined. In either case the chopper disk 41 between the radiation source 33 and the bottom plate 19 is rotated by the motor 42. This provides a pulsed modulation of the radiation from the radiation source 33 and serves to distinguish this radiation from the general background radiation illuminating the radiometer. The modulated signal obtained from a conventional radiometer is readily utilized in conventional monitoring equipment so that the operation of a radiometer in the simulator can be investigated.

The signal flux on the radiometer in the simulator is a function of the temperature of the radiation source and its aperture, and the signal flux on a radiometer from a target body in space is a function of the size of the body and its temperature and range. These quantities can be equated and the photon flux corresponding to a selected target temperature and range is readily provided by the simulator radiation sources. Thus, for example, in a typical infrared radiation simulator constructed according to the principles of this invention, a radiation source of 1.5 cm.$^2$ area at 150° Kelvin gives a total flux in the wavelength band extending from 1 to 15 microns corresponding to a one square meter target at 250° Kelvin at a range of about 300 nautical miles or a target at 350° Kelvin at a range of about 800 nautical miles. A simulator source temperature of 250° Kelvin emits radiation over the 1 to 15 micron wavelength band having a total flux corresponding to the total flux in the 1 to 15 micron range from a target source at 300° Kelvin at a range of 100 nautical miles.

It will be apparent to one skilled in the art that modifications can be made in the simulator illustrated and described without departing from the principles of this invention. Thus, for example, other radiation sources can be employed in lieu of those described and cryogenic liquids other than liquid nitrogen can be employed for other temperature regions. Similarly the diffuse reflective surface on the bottom plate 19 in the preferred embodiment can readily be replaced with a polished reflective surface which may be flat or may have concavity in order to produce a collimated beam of radiation from a radiation source onto a radiometer within the radiometer chamber.

It will be apparent that other modifications and variations of a simulator can be made by one skilled in the art in light of the above teachings. It is therefore to be understood that within the scope of the appended claims the invention may be practiced otherwise than a specifically described.

What is claimed is:
1. A simulator comprising:
   an opaque housing at a first substantially uniform temperature;
   a diffuse reflecting surface in said housing and at the temperature of said housing;
   means for illuminating said reflecting surface with radiant energy having a spectral distribution corresponding to a second temperature different from said first temperature.
2. A simulator as defined in claim 1 wherein said means for illuminating comprises a black body cavity at substantially uniform temperature.
3. A simulator as defined in claim 1 wherein said means for illuminating comprises a piece of highly conductive metal having a high emissivity flat surface thereon; and an electric heater for said piece of metal.
4. A simulator comprising:
   an opaque housing at a first substantially uniform temperature;
   a diffuse reflecting surface in said housing and at the temperature of said housing;
   means for illuminating said reflecting surface with radiant energy having a spectral distribution corresponding to a second temperature different from said first temperature;
   a concave reflective surface opposite said means for illuminating and at the temperature of said housing; and
   a convex reflective surface opposite said concave reflective surface and at the temperature of said housing said concave and convex reflective surfaces cooperating to image said means for illuminating on said reflecting surface in said housing.
5. A cold body detection simulator comprising:
   a cooled chamber having a diffuse reflecting surface therein;
   means for selectively illuminating the reflecting surface with a first variable intensity radiation to effect simulation of background radiation;

means for selectively illuminating at least a portion of the reflective surface with a second selectively variable radiation to simulate a target; and means within the chamber for supporting a radiation sensitive device to receive radiation from the surface.

6. A cold body detection simulator as defined in claim 5 including a cryogenic liquid in the bottom of said chamber in thermal contact with the reflecting surface.

7. A simulator comprising a thermally insulated housing;

means for bringing the interior of the housing to a substantially uniform temperature;

a diffuse reflecting surface on one side of the interior of said housing and at the temperature of said housing;

a first source of radiant energy of a first spectral distribution for illuminating said reflecting surface for simulating background radiation; and a second source of radiant energy of a second spectral distribution for illuminating said reflecting surface for simulating target radiation.

8. A simulator as defined in claim 7 wherein said thermally insulated housing comprises:

an upstanding outer shell having an opening in the top;

a middle shell within the outer shell and having an opening in the top;

thermal insulation between said outer shell and said middle shell; and an inner shell within said middle shell, said inner shell being spaced apart from said middle shell for receiving a liquid between said inner shell and said middle shell, said inner shell being at least partially closed at the top for receiving a liquid thereon.

9. A simulator as defined in claim 7 wherein said means for bringing the interior of the housing to a substantially uniform temperature comprises means for substantially completely surrounding the interior of said housing with a cryogenic liquid.

10. A simulator as defined in claim 7 further comprising a modulator in the path of radiant energy from said second source for modulating radiant energy from said second source.

11. A simulator comprising:

an upstanding outer shell having an opening in the top;

a middle shell inside of and spaced apart from said outer shell and having an opening in the top;

porous thermal insulation between said outer shell and said middle shell;

means for purging said porous insulation with an inert gas;

an inner shell inside said middle shell and spaced apart therefrom on the sides and top thereof, said inner shell being substantially closed on the top thereof;

means for filling the space between said middle shell and said inner shell with a cryogenic liquid including at least some cryogenic liquid on the top of said inner shell;

means for maintaining at least some cryogenic liquid on the floor of said inner shell;

a thermally insulated cover within the opening in the top of said outer and middle shells;

means for maintaining at least some cryogenic liquid in said cover;

a radiometer chamber between said cover and said inner shell including an optical window for viewing the interior of said inner shell from said radiometer chamber;

a diffuse reflecting surface within said inner shell and spaced apart from the floor thereof in thermal contact with cryogenic liquid on the floor; and a source of radiant energy at the top of the simulator for illuminating said reflecting surface with radiant energy having a spectral distribution corresponding to a temperature different from the temperature of the cryogenic liquid.

12. A simulator as defined in claim 11 further comprising:

a second source of radiant energy at the top of the simulator for illuminating said reflecting surface with radiant energy having a spectral distribution corresponding to a temperature different from the temperature of the cryogenic liquid; and a chopper adjacent said first source of radiant energy for intermittently interrupting the flow of radiant energy from said first source to said reflecting surface.

13. A simulator as defined in claim 7 wherein radiant energy from said second source is imaged on said diffuse surface.

References Cited

UNITED STATES PATENTS 3,177,672   4/1965   Seelandt.
3,287,956  11/1966  Dreyfus et al. _____ 73—1

DAVID SCHONBERG, *Primary Examiner.*

S. CLEMENT SWISHER, *Assistant Examiner.*